United States Patent
Kim et al.

(10) Patent No.: US 11,796,731 B2
(45) Date of Patent: Oct. 24, 2023

(54) DISPLAY DEVICE

(71) Applicant: LG CHEM, LTD., Seoul (KR)

(72) Inventors: Nari Kim, Daejeon (KR); Dong Mok Shin, Daejeon (KR); Ji Ho Kim, Daejeon (KR); Hye Mi Oh, Daejeon (KR); Sung Yong Min, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/628,327

(22) PCT Filed: Jan. 8, 2019

(86) PCT No.: PCT/KR2019/000266
§ 371 (c)(1),
(2) Date: Jan. 3, 2020

(87) PCT Pub. No.: WO2019/139329
PCT Pub. Date: Jul. 18, 2019

(65) Prior Publication Data
US 2020/0158938 A1    May 21, 2020

(30) Foreign Application Priority Data

Jan. 15, 2018    (KR) .................. 10-2018-0005007

(51) Int. Cl.
*F21V 8/00* (2006.01)
*G02F 1/1335* (2006.01)
*G02F 1/13357* (2006.01)

(52) U.S. Cl.
CPC .......... *G02B 6/005* (2013.01); *G02B 6/0053* (2013.01); *G02F 1/133514* (2013.01);
(Continued)

(58) Field of Classification Search
CPC .......................................... G02F 2001/133614
See application file for complete search history.

(56) References Cited

U.S. PATENT DOCUMENTS 6,229,252 B1 *   5/2001   Teng ............... G02B 5/223
                                                    313/112
2005/0046321 A1   3/2005   Suga et al.
(Continued)

FOREIGN PATENT DOCUMENTS

EP       0971421 A2     1/2000
JP     2009104941 A     5/2009
(Continued)

OTHER PUBLICATIONS

Zhao, Yun et al. "Through-Bond Energy Transfer Cassettes Based on coumarin-Bodipy/distyryl Bodipy Dyads with Efficient Energy Efficiencies and Large Pseudo-Stokes' Shifts." Journal of materials chemistry 21.35 (2011): 13168-13171. (Year: 2011).*

(Continued)

*Primary Examiner* — Alexander P Gross
(74) *Attorney, Agent, or Firm* — ROTHWELL, FIGG, ERNST & MANBECK, P.C.

(57) ABSTRACT

The present specification relates to a display device including: a liquid crystal panel; and a backlight unit, in which the backlight unit includes one or more color conversion films, the liquid crystal panel or backlight unit includes a light absorption layer, and the color conversion film includes, during light irradiation, a first light emission peak in which a light emission peak having the largest height within a wavelength range of 500 nm to 560 nm is present within 520 nm to 535 nm and a full width at half maximum of the light emission peak is 50 nm or less and a second light emission peak in which a light emission peak having the largest height within a wavelength range of 600 nm to 780 nm is present within 625 nm to 640 nm and a full width at half maximum of the light emission peak is 60 nm or less.

6 Claims, 2 Drawing Sheets

(52) U.S. Cl.
CPC .. *G02F 1/133614* (2021.01); *G02F 1/133617* (2013.01); *G02F 2202/046* (2013.01)

(56) References Cited

U.S. PATENT DOCUMENTS

| | | | |
|---|---|---|---|
| 2010/0067214 A1* | 3/2010 | Hoelen | G02F 1/133603 |
| | | | 362/84 |
| 2010/0103355 A1* | 4/2010 | Sakamoto | G02F 1/133509 |
| | | | 349/106 |
| 2015/0378089 A1 | 12/2015 | Oba et al. | |
| 2016/0186960 A1* | 6/2016 | Kim | G02F 1/1336 |
| | | | 349/71 |
| 2016/0349573 A1 | 12/2016 | Ohmuro et al. | |
| 2017/0017120 A1 | 1/2017 | Choi et al. | |
| 2017/0186922 A1* | 6/2017 | Kim | C09K 11/703 |
| 2017/0205664 A1 | 7/2017 | Cho et al. | |
| 2017/0267921 A1* | 9/2017 | Shin | C09K 11/06 |
| 2017/0329179 A1 | 11/2017 | Cho et al. | |
| 2017/0371084 A1* | 12/2017 | Lee | G02B 6/005 |
| 2017/0373229 A1 | 12/2017 | Shin et al. | |
| 2019/0113664 A1 | 4/2019 | Yoshikawa et al. | |
| 2019/0185745 A1* | 6/2019 | Watanabe | C07F 5/02 |

FOREIGN PATENT DOCUMENTS

| | | |
|---|---|---|
| JP | 2012-084512 A | 4/2012 |
| JP | 2017-173815 A | 9/2017 |
| KR | 10-2000-0011622 A | 2/2000 |
| KR | 10-2014-0143060 A | 12/2014 |
| KR | 10-2014-0144167 A | 12/2014 |
| KR | 10-2016-0050933 A | 5/2016 |
| KR | 10-2016-0094887 A | 8/2016 |
| KR | 10-1746722 B1 | 6/2017 |
| KR | 10-2017-0078553 A | 7/2017 |
| TW | 200302943 A | 8/2003 |
| WO | 2015-098906 A1 | 7/2015 |
| WO | WO-2016122283 A1 * | 8/2016 ........... C09K 11/025 |

OTHER PUBLICATIONS

International Search Report and Written Opinion issued for International Application No. PCT/KR2019/000266 dated Apr. 9, 2019, 9 pages.

Extended European Search Report issued for corresponding European Patent Application No. 19738975.2 dated Jul. 1, 2020, 10 pages.

* cited by examiner

DISPLAY DEVICE

TECHNICAL FIELD

This application is a 35 U.S.C. § 371 National Phase Entry Application from PCT/KR2019/000266, filed on Jan. 8, 2019, and designating the United States, which claims priority to and the benefit of Korean Patent Application No. 10-2018-0005007 filed in the Korean Intellectual Property Office on Jan. 15, 2018, the entire contents of which are incorporated herein by reference.

The present specification relates to a display device.

BACKGROUND ART

The existing light emitting diodes (LEDs) are obtained by mixing a green phosphor and a red phosphor with a blue light emitting diode or mixing a yellow phosphor and a blue-green phosphor with a UV light emission light emitting diode. However, in this method, it is difficult to control colors, and accordingly, the color rendition is not good. Therefore, the color gamut deteriorates.

In order to overcome the narrow color gamut and reduce the production costs, methods of implementing green and red colors have been recently attempted by using a method of producing a quantum dot in the form of a film and combining the same with a blue LED. However, cadmium-based quantum dots have safety problems and other quantum dots have a problem in that the efficiency significantly deteriorates as compared to the cadmium-based quantum dots, so that interests have been focused in the manufacture of a backlight unit to which a material having a relatively high efficiency and having no stability issue is applied and a display device including the same.

DETAILED DESCRIPTION OF INVENTION

The present specification relates to a display device.

An exemplary embodiment of the present specification provides a display device including:

a liquid crystal panel; and
a backlight unit,
wherein the backlight unit includes one or more color conversion films,
a light adsorption layer is included in the liquid crystal panel or the backlight unit, and
the conversion films have, during light irradiation, (1) a first light emission peak in which a light emission peak having the maximum height in a wavelength range of 500 nm to 560 nm is present from 520 nm to 535 nm and a full width at half maximum of the light emission peak is 50 nm or less and (2) a second light emission peak in which a light emission peak having the maximum height in a wavelength range of 600 nm to 780 nm is present from 625 nm to 640 nm and a full width at half maximum of the light emission peak is 60 nm or less.

Advantageous Effects

A display device according to an exemplary embodiment of the present specification exhibits an effect in which color gamut and brightness are improved.

10: Backlight unit
20: Liquid crystal panel
30: Color conversion film
40: Light absorption layer
100: Reflecting plate
200: Light guide plate
300: Light source
30: Color conversion film
400: Prism sheet
500: brightness enhancement film

BEST MODE

An exemplary embodiment of the present specification provides a display device including:

a liquid crystal panel; and
a backlight unit,
in which the backlight unit includes one or more color conversion films,
the liquid crystal panel or backlight unit includes a light absorption layer, and
the color conversion film shows, during light irradiation, a first light emission peak in which a light emission peak having the maximum height in a wavelength range of 500 nm to 560 nm is present from 520 nm to 535 nm and a full width at half maximum of the light emission peak is 50 nm or less and a second light emission peak in which a light emission peak having the maximum height in a wavelength range of 600 nm to 780 nm is present from 625 nm to 640 nm and a full width at half maximum of the light emission peak is 60 nm or less.

In general, when a light absorption layer is applied to a white LED using a yellow fluorescent substance, the color gamut increases but the brightness decreases, whereas a display device according to an exemplary embodiment of the present specification has an effect in that both brightness and color gamut are improved by applying both a color conversion film and a light absorption layer, in which the maximum light emission peak ranges are limited.

In an exemplary embodiment of the present specification, in the second light emission peak, a light emission peak having the largest height in a wavelength range of 600 nm to 780 nm is present from 630 nm to 640 nm.

In an exemplary embodiment of the present specification, the color conversion film includes, during light irradiation, a first light emission peak in which a light emission peak having the maximum height in a wavelength range of 500 nm to 560 nm is present from 520 nm to 535 nm and a full width at half maximum of the light emission peak is 50 nm or less and a second light emission peak in which a light emission peak having the maximum height in a wavelength range of 600 nm to 780 nm is present from 630 nm to 640 nm and a full width at half maximum of the light emission peak is 60 nm or less.

In an exemplary embodiment of the present specification, the first light emission peak in which the light emission peak having the maximum height in a wavelength range of 500 nm to 560 nm is present from 520 nm to 535 nm and a full width at half maximum of the light emission peak is 50 nm or less may have characteristics of a green fluorescent substance.

In an exemplary embodiment of the present specification, the second light emission peak in which the light emission peak having the maximum height in a wavelength range of 600 nm to 780 nm is present from 625 nm to 640 nm and a full width at half maximum of the light emission peak is 60 nm or less may have characteristics of a red fluorescent substance.

In an exemplary embodiment of the present specification, the color conversion film may include, during light irradiation, a green fluorescent substance in which a light emission peak having the maximum height in a wavelength range of 500 nm to 560 nm is present from 520 nm to 535 nm and a full width at half maximum of the light emission peak is 50 nm or less and a red fluorescent substance in which a light emission peak having the maximum height in a wavelength range of 600 nm to 780 nm is present from 625 nm to 640 nm and a full width at half maximum of the light emission peak is 60 nm or less.

In an exemplary embodiment of the present specification, in the color conversion film, the first light emission peak and the second light emission peak may be included in a single film. That is, in one color conversion film, both the first light emission peak and the second light emission peak may be exhibited.

In an exemplary embodiment of the present specification, the green fluorescent substance and the red fluorescent substance may be included in a single film. For example, the one color conversion film may include both the green fluorescent substance and the red fluorescent substance.

In an exemplary embodiment of the present specification, the display device may include one color conversion film including both the green fluorescent substance and the red fluorescent substance.

In an exemplary embodiment of the present specification, the single film may also be a film simultaneously including a red fluorescent substance and a green fluorescent substance, and may also be formed in the form of a single film manufactured by forming a film including a red fluorescent substance and a film including a green fluorescent substance, and then laminating the two films via an adhesive film.

In an exemplary embodiment of the present specification, the color conversion film may include a first color conversion film including the above-described first light emission peak and a second color conversion film including the second light emission peak. For example, the green fluorescent substance and the red fluorescent substance may be included in different films, respectively. That is, a first color conversion film including a green fluorescent substance and a second color conversion film including a red fluorescent substance may be each provided.

In an exemplary embodiment of the present specification, the display device may include two color conversion films including in which a green fluorescent substance and a red fluorescent substance are provided, respectively.

In an exemplary embodiment of the present specification, the display device includes one or more color conversion films. Specifically, one or two color conversion film or films may be provided in the display device.

In the present specification, "a green fluorescent substance" absorbs at least a part of a blue light to emit a green light, and "a red fluorescent substance" absorbs at least a part of a blue light or a green light to emit a red light. For example, the red fluorescent substance may absorb not only a blue light but also light having a wavelength of 500 nm to 600 nm.

In the present specification, for the blue light, the green light, and the red light, the definitions known in the art may be used, and for example, the blue light is light having a wavelength selected from a wavelength of 400 nm to 500 nm, the green light is light having a wavelength selected from a wavelength of 500 nm to 560 nm, and the red light is light having a wavelength selected from a wavelength of 600 nm to 780 nm.

In the present specification, the "full width at half maximum" means a width of a light emission peak at a half of the maximum height in a maximum height light emission peak of light emitted from a color conversion film by absorbing the foregoing light. The smaller the full widths at half maximum of the organic fluorescent substance and the color conversion film are, the better the organic fluorescent substance and the color conversion film are.

In an exemplary embodiment of the present specification, the color conversion film includes: a resin matrix; and an organic fluorescent substance dispersed in the resin matrix. The organic fluorescent substance is a green fluorescent substance and/or a red fluorescent substance.

In an exemplary embodiment of the present specification, the color conversion film includes an organic fluorescent substance. Specifically, the color conversion film includes a boron-dipyrromethene (BODIPY)-based organic fluorescent substance. More specifically, the green fluorescent substance and/or the red fluorescent substance may be a BODIPY-based fluorescent substance.

In an exemplary embodiment of the present specification, the green fluorescent substance may be a compound represented by the following Formula 1.

[Formula 1]

In Formula 1,

X1 and X2 are the same as or different from each other, and are each independently a halogen group; a cyano group; a nitro group; an imide group; an amide group; a carbonyl group; an ester group; a substituted or unsubstituted fluoroalkyl group; a substituted or unsubstituted sulfonyl group; a substituted or unsubstituted sulfonamide group; a substituted or unsubstituted alkoxy group; a substituted or unsubstituted aryloxy group; or a substituted or unsubstituted aryl group, or X1 and X2 may be bonded to each other to form a substituted or unsubstituted ring, R1 to R4 are the same as or different from each other, and are each independently hydrogen; deuterium; a nitro group; a substituted or unsubstituted ester group; a substituted or unsubstituted alkyl group; a substituted or unsubstituted fluoroalkyl group; a substituted or unsubstituted cycloalkyl group; a substituted or unsubstituted alkoxy group; a substituted or unsubstituted aryloxy group; or a substituted or unsubstituted aliphatic heterocyclic group, R5 and R6 are the same as or different from each other, and are each independently hydrogen; a cyano group; a nitro group; an alkyl group; a carboxyl group; a substituted or unsubstituted alkyl group; a substituted or unsubstituted sulfonyl group; or an aryl group unsubstituted or substituted with an arylalkynyl group, R1 and R5 may be linked to each other to form a substituted or unsubstituted hydrocarbon ring or a substituted or unsubstituted hetero ring, and R4 and R6 may be linked to each other to form a substituted or unsubstituted hydrocarbon ring or a substituted or unsubstituted hetero ring, and R7 is hydrogen; an alkoxy group; a substituted or unsubstituted alkyl group; a substituted or unsubstituted aryloxy group; a haloalkyl group; or a substituted or unsubstituted aryl group.

In an exemplary embodiment of the present specification, R1 to R4 are the same as or different from each other, and are each independently a substituted or unsubstituted alkyl group; or a substituted or unsubstituted cycloalkyl group.

In an exemplary embodiment of the present specification, R1 to R4 are the same as or different from each other, and are each independently a substituted or unsubstituted straight-chained alkyl group; or a substituted or unsubstituted monocyclic cycloalkyl group.

In an exemplary embodiment of the present specification, R1 to R4 are the same as or different from each other, and are each independently a methyl group; a cyclohexane group; or a cycloheptane group.

In an exemplary embodiment of the present specification, R5 and R6 are the same as or different from each other, and are each independently hydrogen; or a cyano group.

In an exemplary embodiment of the present specification, R7 is an alkoxy group; a substituted or unsubstituted aryloxy group; or a substituted or unsubstituted aryl group.

In an exemplary embodiment of the present specification, R7 is an alkoxy group; a substituted or unsubstituted aryloxy group; or an aryl group unsubstituted or substituted with one or more of a halogen group, an ester group, an alkyl group, an alkoxy group, an aryl group or an alkylaryl group.

In an exemplary embodiment of the present specification, R7 is an aryl group unsubstituted or substituted with an ester group and an alkoxy group; an aryloxy group; or an alkoxy group.

In an exemplary embodiment of the present specification, R7 is a phenyl group substituted with an ester group and an alkoxy group; a phenyl group; or a phenoxy.

In an exemplary embodiment of the present specification, X1 and X2 are the same as or different from each other, and are each independently a halogen group.

In an exemplary embodiment of the present specification, X1 and X2 are each fluorine.

In an exemplary embodiment of the present specification, the compound of Formula 1 is selected from the following structural formulae.

In an exemplary embodiment of the present specification, the red fluorescent substance may be a compound represented by the following Formula 2.

[Formula 2]

In Formula 2,

R11, R13, R14, and R16 are the same as or different from each other, and are each independently a substituted or unsubstituted aryl group; or a substituted or unsubstituted heterocyclic group, R12 and R15 are the same as or different from each other, and are each independently hydrogen; deuterium; a halogen group; a nitrile group; a nitro group; a hydroxyl group; a carboxyl group (—COOH); an ether group; an ester group; an imide group; an amide group; a substituted or unsubstituted alkyl group; a substituted or unsubstituted cycloalkyl group; a substituted or unsubstituted alkoxy group; a substituted or unsubstituted aryloxy group; a substituted or unsubstituted alkylthioxy group; a substituted or unsubstituted arylthioxy group; a substituted or unsubstituted alkylsulfoxy group; a substituted or unsubstituted arylsulfoxy group; a substituted or unsubstituted alkenyl group; a substituted or unsubstituted silyl group; a substituted or unsubstituted boron group; a substituted or unsubstituted amine group; a substituted or unsubstituted arylphosphine group; a substituted or unsubstituted phosphine oxide group; a substituted or unsubstituted coumarin group; a substituted or unsubstituted aryl group; a substituted or unsubstituted anthracenyl group; a substituted or unsubstituted phenanthrenyl group; a substituted or unsubstituted phenalenyl group; or a substituted or unsubstituted heterocyclic group, X3 and X4 are the same as or different from each other, and are each independently a halogen group; a nitrile group; a substituted or unsubstituted ester group; a substituted or unsubstituted alkyl group; a substituted or unsubstituted alkoxy group; a substituted or unsubstituted alkenyl group; a substituted or unsubstituted alkynyl group; a substituted or unsubstituted aryl group; a substituted or unsubstituted aryloxy group; or a substituted or unsubstituted heterocyclic group, and R17 is a substituted or unsubstituted heterocyclic group; or a coumarin group.

In an exemplary embodiment of the present specification, R11, R13, R14, and R16 are the same as or different from each other, and are each independently a substituted or unsubstituted aryl group.

In an exemplary embodiment of the present specification, R11, R13, R14, and R16 are the same as or different from each other, and are each independently a phenyl group; a phenyl group substituted with a substituted or unsubstituted fluorenyl group; a phenyl group substituted with a substituted or unsubstituted phenyl group; a phenyl group substituted with an alkoxy group; a biphenyl group substituted with a haloalkyl group; or a phenyl group substituted with a substituted or unsubstituted alkyl group.

In an exemplary embodiment of the present specification, R11, R13, R14, and R16 are the same as or different from each other, and are each independently a phenyl group; a phenyl group substituted with a diphenylfluorene group; a biphenyl group substituted with CF3; a phenyl group substituted with a branched alkyl group having 1 to 10 carbon atoms; or a phenyl group substituted with a methoxy group.

In an exemplary embodiment of the present specification, R12 and R15 are each hydrogen.

In an exemplary embodiment of the present specification, X3 and X4 are the same as or different from each other, and are each independently a halogen group; or a substituted or unsubstituted alkynyl group.

In an exemplary embodiment of the present specification, X3 and X4 are the same as or different from each other, and are each independently fluorine; or

In this case, is a moiety bonded to Formula 2.

In an exemplary embodiment of the present specification, R17 is a dibenzofuran group; or a coumarin group.

In an exemplary embodiment of the present specification, the compound of Formula 2 is selected from the following structural formulae.

-continued

In the present specification, the term "substituted or unsubstituted" means being substituted with one or two or more substituents selected from the group consisting of deuterium; a halogen group; a nitrile group; a nitro group; an imide group; an amide group; a carbonyl group; an ester group; a hydroxyl group; an alkyl group; a cycloalkyl group; an alkoxy group; an aryloxy group; an alkylthioxy group; an arylthioxy group; an alkylsulfoxy group; an arylsulfoxy group; an alkenyl group; a silyl group; a siloxane group; a boron group; an amine group; an arylphosphine group; a phosphine oxide group; an aryl group; and a heterocyclic group, or being substituted with a substituent to which two or more substituents among the exemplified substituents are linked, or having no substituent. For example, "the substituent to which two or more substituents are linked" may be a biphenyl group. That is, the biphenyl group may also be an aryl group, and may be interpreted as a substituent to which two phenyl groups are linked.

In the present specification, a halogen group may be fluorine, chlorine, bromine or iodine.

In the present specification, the alkyl group may be straight-chained or branched, and the number of carbon atoms thereof is not particularly limited, but is preferably 1 to 30. Specific examples thereof include methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, isopentyl, neopentyl, tert-pentyl, hexyl, n-hexyl, 2-ethylhexyl, 2-ethylbutyl, 1-methylpentyl, 2-methylpentyl, 4-methyl-2-pentyl, 3,3-dimethylbutyl, heptyl, n-heptyl, 1-methylhexyl, octyl, n-octyl, tert-octyl, 1-methylheptyl, 2-propylpentyl, n-nonyl, 2,2-dimethylheptyl, 1-ethyl-propyl, 1,1-dimethyl-propyl, isohexyl, 4-methylhexyl, 5-methylhexyl, 2,6-dimethyloctane, and the like, but are not limited thereto.

In the present specification, a cycloalkyl group is not particularly limited, but has preferably 3 to 30 carbon atoms, and specific examples thereof include cyclopropyl, cyclobutyl, cyclopentyl, 3-methylcyclopentyl, 2,3-dimethylcyclopentyl, cyclohexyl, 3-methylcyclohexyl, 4-methylcyclohexyl, 2,3-dimethylcyclohexyl, 3,4,5-trimethylcyclohexyl, 4-tert-butylcyclohexyl, cycloheptyl, cyclooctyl, and the like, but are not limited thereto.

In the present specification, an aryl group may be monocyclic or polycyclic.

When the aryl group is a monocyclic aryl group, the number of carbon atoms thereof is not particularly limited, but is preferably 6 to 30. Specific examples of the monocyclic aryl group include a phenyl group, a biphenyl group, a terphenyl group, and the like, but are not limited thereto.

When the aryl group is a polycyclic aryl group, the number of carbon atoms thereof is not particularly limited, but is preferably 10 to 30. Specific examples of the polycyclic aryl group include a naphthyl group, an anthracenyl group, a phenanthryl group, a pyrenyl group, a perylenyl group, a chrysenyl group, a fluorenyl group, and the like, but are not limited thereto.

In the present specification, the fluorenyl group may be substituted, and adjacent substituents may be bonded to each other to form a ring.

When the fluorenyl group is substituted, the substituent may be and the like. However, the substituent is not limited thereto.

In the present specification, the alkoxy group may be straight-chained, branched, or cyclic. The number of carbon atoms of the alkoxy group is not particularly limited, but is preferably 1 to 30. Specific examples thereof include methoxy, ethoxy, n-propoxy, isopropoxy, i-propyloxy, n-butoxy, isobutoxy, tert-butoxy, sec-butoxy, n-pentyloxy, neopentyloxy, isopentyloxy, n-hexyloxy, 3,3-dimethylbutyloxy, 2-ethylbutyloxy, n-octyloxy, n-nonyloxy, n-decyloxy, benzyloxy, p-methylbenzyloxy, phenoxy, and the like, but are not limited thereto.

In the present specification, for a coumarin group, the carbon of the coumarin group may be substituted with a halogen group; a nitrile group; a straight-chained, branched, or cyclic alkyl group having 1 to 25 carbon atoms; an amine group; a straight-chained or branched alkoxy group having 1 to 25 carbon atoms; or an aryl group having 6 to 30 carbon atoms. Specifically, the coumarin group may be a compound having the following structural formulae, but is not limited thereto.

In an exemplary embodiment of the present specification, it is preferred that a material for the resin matrix is a thermoplastic polymer or a thermosetting polymer. Specifically, as the material for the resin matrix, it is possible to use a poly(meth)acrylic resin such as polymethylmethacrylate (PMMA), a polycarbonate (PC)-based resin, a polystyrene (PS)-based resin, a polyarylene (PAR)-based resin, a polyurethane (TPU)-based resin, a styrene-acrylonitrile (SAN)-based resin, a polyvinylidenefluoride (PVDF)-based resin, a modified-polyvinylidenefluoride (modified-PVDF)-based resin, and the like.

In an exemplary embodiment of the present specification, the color conversion film may include the organic fluorescent substance in an amount of 0.005 part by weight to 4 parts by weight based on 100 parts by weight of a resin matrix solid content. More specifically, the organic fluorescent substance may be included in an amount of 0.05 part by weight to 4 parts by weight based on 100 parts by weight of a resin matrix solid content.

In an exemplary embodiment of the present specification, when the color conversion film includes both a green fluorescent substance and a red fluorescent substance, a weight ratio of the green fluorescent substance to the red fluorescent substance may be 1:1 to 50:1.

In an exemplary embodiment of the present specification, when the color conversion film includes a green fluorescent substance, the green fluorescent substance may be included in an amount of 0.05 part by weight to 4 parts by weight based on 100 parts by weight of a resin matrix solid content. More specifically, the green fluorescent substance may be included in an amount of 0.05 part by weight to 2 parts by weight based on 100 parts by weight of a resin matrix solid content.

In an exemplary embodiment of the present specification, when the color conversion film includes a red fluorescent substance, the red fluorescent substance may be included in an amount of 0.005 part by weight to 4 parts by weight based on 100 parts by weight of a resin matrix solid content. More specifically, the red fluorescent substance may be included in an amount of 0.005 part by weight to 2 parts by weight based on 100 parts by weight of a resin matrix solid content.

In an exemplary embodiment of the present specification, the color conversion film according to the above-described exemplary embodiment additionally includes light diffusion particles. By dispersing light diffusion particles in the color conversion film instead of a light diffusion film used in the related art in order to improve brightness, an attaching process may be omitted, and higher brightness may be exhibited as compared to the case where a separate light diffusion film is used.

As the light diffusion particle, a resin matrix and a particle having a high refractive index may be used, and examples thereof include $TiO_2$, silica, borosilicate, alumina, sapphire, air or another gas, air- or gas-filled hollow beads or particles (for example, air/gas-filled glass or polymer); polymer particles including polystyrene, polycarbonate, polymethylmethacrylate, acryl, methyl methacrylate, styrene, a melamine resin, a formaldehyde resin, melamine, and a formaldehyde resin; or any suitable combination thereof.

The light diffusion particles may have a particle diameter within a range of 0.1 μm to 5 μm. The content of the light diffusion particles may be determined, if necessary, and may be, for example, within a range of about 1 part by weight to about 30 parts by weight based on 100 parts by weight of the resin matrix solid content.

In an exemplary embodiment of the present specification, the color conversion film may have a thickness of 2 μm to 20 μm. Although the color conversion film has a small thickness, the color conversion film may exhibit high brightness because the content of organic fluorescent substance molecules included in the unit volume is higher than that of the quantum dot.

In an exemplary embodiment of the present specification, the maximum height light emission peak range and the full width at half maximum range of the organic fluorescent substance are measured in a film state. The film may be manufactured by using a method of coating a resin solution in which a green fluorescent substance and/or a red fluorescent substance are dissolved onto a substrate and drying the resin solution or a method of extruding an organic fluorescent substance with a resin.

More specifically, the maximum height light emission peak range and the full width at half maximum range of an organic fluorescent substance produced in a film form may be measured by irradiating the organic fluorescent substance with light having a light emission peak at 440 nm to 460 nm, a full width at half maximum of 40 nm or less, and monomodal light emission intensity distribution.

In an exemplary embodiment of the present specification, the light emission peak of the color conversion film may be measured by irradiating the color conversion film with light having a light emission peak at 440 nm to 460 nm, a full width at half maximum of 40 nm or less, and monomodal light emission intensity distribution.

In an exemplary embodiment of the present specification, the substrate may function as a support during the manufacture of the color conversion film. The kind of substrate is not particularly limited, and the material or thickness of the substrate is not limited as long as the substrate is transparent and may function as the support. Here, transparency means that the transmittance of visible light is 75% or more. For example, as the substrate, a PET film, a TAC film, and the like may be used.

In an exemplary embodiment of the present specification, as for the resin solution, the production method is not particularly limited as long as the organic fluorescent substance and the resin described above are dissolved in the solution. For example, the resin solution in which the organic fluorescent substance is dissolved may be produced by a method of preparing a first solution by dissolving an organic fluorescent substance in a solvent, preparing a second solution by dissolving a resin in a solvent, and then mixing the first solution and the second solution. When the first solution and the second solution are mixed, it is preferred to uniformly mix the solutions. However, the method of producing a resin solution is not limited thereto, and it is possible to use a method of simultaneously adding and dissolving an organic fluorescent substance and a resin in a solvent, a method of dissolving an organic fluorescent substance in a solvent and subsequently adding and dissolving a resin, a method of dissolving a resin in a solvent and subsequently dissolving an organic fluorescent substance, and the like.

As the resin included in the resin solution, it is possible to use a material for the above-described resin matrix, a monomer which is curable by the resin matrix, or a mixture thereof. Examples of the monomer which is curable by the resin matrix include a (meth)acrylic monomer, and the monomer may be formed as a resin matrix material by UV curing. When a curable monomer is used as described above, an initiator required for curing may be further added, if necessary.

The solvent is not particularly limited as long as the solvent does not adversely affect the coating process and may be removed by a subsequent drying. As a non-limiting example of the solvent, it is possible to use toluene, xylene, acetone, chloroform, various alcohol-based solvents, methyl ethyl ketone (MEK), methyl isobutyl ketone (MIBK), ethyl acetate (EA), butyl acetate, dimethylformamide (DMF), dimethylacetamide (DMAc), dimethylsulfoxide (DMSO), N-methyl-pyrrolidone (NMP), and the like, and one or a mixture of two or more thereof may be used. When the first solution and the second solution are used, the solvents included in each of the solutions may also be the same as or different from each other. Even when different solvents are used in the first solution and the second solution, it is preferred that these solvents have compatibility so as to be mixed with each other.

A process of coating the resin solution, in which the organic fluorescent substance is dissolved, onto a substrate may use a roll-to-roll process. For example, the process may be performed by a process of unwinding a substrate from a roll on which the substrate is wound, coating a resin solution, in which the organic fluorescent substance is dissolved, onto one surface of the substrate, drying the resin solution, and then winding the substrate again on the roll. When the roll-to-roll process is used, it is preferred that the viscosity of the resin solution is determined within a range in which the process may be implemented, and the viscosity may be determined within a range of, for example, 50 cps to 2,000 cps.

As the coating method, various publicly-known methods may be used. For example, a die coater may also be used, and various bar-coating methods such as a comma coater and a reverse comma coater may also be used.

In an exemplary embodiment of the present specification, a drying process is performed after the coating. The drying process may be performed under conditions required for removing the solvent. For example, a color conversion film including an organic fluorescent substance having desired thickness and concentration may be obtained on a substrate by drying the solvent in an oven located close to a coater under a condition to sufficiently evaporate a solvent, in a direction of the substrate progressing during the coating process.

When the monomer which is curable by the resin matrix is used as a resin included in the solution, curing, for example, UV curing or heat curing may be performed before the drying or simultaneously with the drying.

In an exemplary embodiment of the present specification, when the organic fluorescent substance is filmed by being extruded with a resin, an extrusion method known in the art may be used, and for example, a color conversion film may be manufactured by extruding the fluorescent substance with a resin such as a polycarbonate (PC)-based resin, a poly(meth)acrylic resin, and a styrene-acrylonitrile (SAN)-based resin.

In an exemplary embodiment of the present specification, the light absorption layer includes: a resin matrix; and a dye or pigment having a maximum absorption wavelength at 560 nm to 610 nm dispersed in the resin matrix. Accordingly, the light absorption layer has a maximum absorption wavelength at 560 nm to 610 nm. Specifically, the light absorption layer has a maximum absorption wavelength at 570 nm to 600 nm. When the maximum absorption wavelength of the light absorption layer is out of the above range, color imbalance may be caused. Further, the maximum absorption wavelength of the light absorption layer satisfies the above range, so that there is an effect of improving the color gamut of a display device by absorbing unnecessary light in a region in which colors are mixed because the light is not completely removed from the color conversion film.

In an exemplary embodiment of the present specification, the dye or pigment included in the light absorption layer may be a squarylium derivative compound, a porphyrin derivative compound, a cyanine derivative compound, or a mixture thereof.

In an exemplary embodiment of the present specification, the resin matrix included in the light absorption layer may include one or more of a thermoplastic resin, a thermosetting resin, and a UV-curable resin. The thermoplastic resin, the thermosetting resin, and the UV-curable resin can be used without limitation as long as these resins are materials used in the art. Specifically, it is possible to use a poly(meth)acrylic resin such as polymethylmethacrylate (PMMA), a polycarbonate (PC)-based resin, a polystyrene (PS)-based resin, a polyarylene (PAR)-based resin, a polyurethane (TPU)-based resin, a styrene-acrylonitrile (SAN)-based resin, a polyvinylidenefluoride (PVDF)-based resin, a modified-polyvinylidenefluoride (modified-PVDF)-based resin, a urethane-based resin, an epoxy-based resin, an acrylate-based resin, and the like, but these resins are not limited thereto.

In an exemplary embodiment of the present specification, the dye or pigment may be included in an amount of 0.1 part by weight to 3 parts by weight based on a resin matrix solid content.

In an exemplary embodiment of the present specification, the light absorption layer may have a light transmittance of 5% to 40% at 560 nm to 610 nm.

The light transmittance is confirmed by using a UV-visible spectrometer to measure a transmittance in a visible light region, and a low light transmittance means that the light absorption rate is high.

In an exemplary embodiment of the present specification, the maximum absorption wavelength range of the light absorption layer is measured in a film state. The film state may be formed by a method of coating a solution in which a light absorption material is dissolved onto a substrate and drying the solution.

In an exemplary embodiment of the present specification, the kind of substrate of the light absorption layer is not particularly limited, and the material or thickness of the light absorption layer is not limited as long as the light absorption layer is transparent. Here, transparency means that the transmittance of visible light is 75% or more. For example, as the substrate, a PET film, a TAC film, and the like may be used.

In an exemplary embodiment of the present specification, the light absorption layer may be formed by a coating process on one surface of the color conversion film or a separate substrate. As the coating method, various publicly-known methods may be used, and for example, a die coater may also be used, and various bar-coating methods such as a comma coater, a reverse comma coater, and a gravure coater may be used.

In an exemplary embodiment of the present specification, the light absorption layer may have a thickness of 1 μm to 30 μm. More preferably, the thickness may be 3 μm to 25 μm.

In an exemplary embodiment of the present specification, a solvent may be used in order to form the light absorption layer. The solvent can be used without limitation as long as the solvent is a material used in the art. Specifically, it is possible to use methyl ethyl ketone (MEK), propylene glycol methyl ether acetate (PGMEA), dimethylformamide (DMF), toluene, xylene, methylisobutylketone (MIBK), and the like, but the solvent is not limited thereto.

In an exemplary embodiment of the present specification, the backlight unit may have a backlight unit configuration known in the art, except that the backlight unit includes the above-described color conversion film.

In an exemplary embodiment of the present specification, the backlight unit includes one or more color conversion films as described above. Specifically, the backlight unit includes one or two color conversion film(s).

In an exemplary embodiment of the present specification, the backlight unit further includes at least one of a light guide plate; a reflecting plate; a light collecting film; and a brightness enhancement film. For example, the backlight unit may have a structure in which a reflecting plate/a light guide plate/a color conversion film/two light collecting films/a brightness enhancement film are stacked.

In an exemplary embodiment of the present specification, a prism sheet may be used as the light collecting film. One prism sheet or two prism sheets may be included in the light collecting film, and arrangements of prism in these sheets may be stacked in a vertical direction to each other. For example, the light collecting film may include a first light collecting film and a second light collecting film. In this case, the first light collecting film may be a first prism sheet, and the second light collecting film may be a second prism sheet in which the first prism sheet and the arrangement of prism are stacked vertically to each other.

In an exemplary embodiment of the present specification, those publicly known may be used as the prism sheet. When a prism sheet is used as a light collecting film, the color conversion film may be provided on either surface of a surface of the light collecting film on which a prism is provided or a surface of the light collecting film on which a prism is not provided. In this case, the surface on which the prism is provided is an uneven surface of the prism sheet, and the surface on which the prism is not provided may mean an even surface of the prism sheet.

In an exemplary embodiment of the present specification, the first light collecting film and the second light collecting film may be bonded to each other by an adhesive agent. In this case, the adhesive agent can be used without limitation as long as the adhesive agent is material used in the art.

In an exemplary embodiment of the present specification, the brightness enhancement film may be a double brightness enhanced film (DBEF) or an advanced polarizer film (APF).

Figure 1:
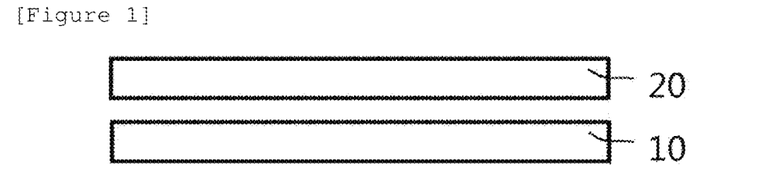
FIGS. 1 and 2 exemplify a structure of a display device according to an exemplary embodiment of the present specification.
Figure 2:
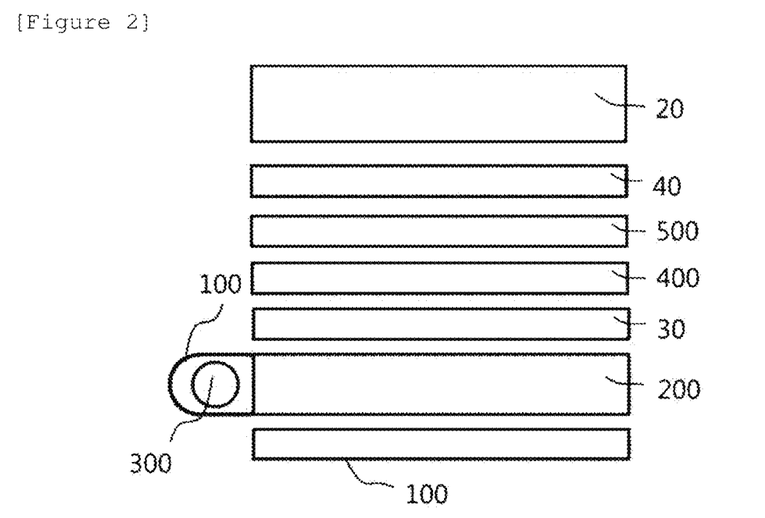

FIGS. 1 and 2 exemplify a structure of a display device according to an exemplary embodiment of the present specification. Specifically, FIG. 1 illustrates a display device including a backlight unit 10 and a liquid crystal panel 20. In this case, the backlight unit includes the above-described color conversion film. FIG. 2 exemplifies a stacking structure of a backlight unit, a light absorption layer, and a liquid crystal panel. More specifically, FIG. 2 exemplifies a structure in which a light absorption layer 40 and a liquid crystal panel 20 are provided on a backlight unit in which a reflecting plate 100, a light guide plate 200, a color conversion film 30, a prism sheet 400, and a brightness enhancement film 500 are sequentially stacked. In addition, FIG. 2 exemplifies a structure in which a light source 300 and a reflecting plate 100 surrounding the light source 300 are provided on a side surface of a light guide plate 200.

In an exemplary embodiment of the present specification, the backlight unit includes a light source including a light emission lamp that emits light having a maximum light emission wavelength of 440 nm to 460 nm.

FIG. 2 exemplifies a configuration including a light source 300 and a reflecting plate 100 surrounding the light source 300, but the configuration is not limited to such a structure, and may be modified depending on the structure of the backlight unit known in the art. Furthermore, as the light source, a side-chain type or a direct type may also be used, and a reflecting plate or a reflecting layer may be omitted or replaced with another configuration, if necessary.

In an exemplary embodiment of the present specification, the liquid display panel includes a liquid crystal, a color filter, and a polarizing plate. In this case, the polarizing plate may be included at an upper portion and/or lower portion of a liquid crystal.

In an exemplary embodiment of the present specification, the light absorption layer may be located in a liquid crystal panel or a backlight unit. Specifically, when the light absorption layer is included in a liquid crystal panel, the light absorption layer may be included in an upper polarizing plate or a lower polarizing plate. More specifically, the light absorption layer may be included in an adhesive layer, a protective film, or like in a polarizing plate. Meanwhile, when the light absorption layer is included in a backlight unit, the light absorption layer may be included in a form of being coated onto an upper portion of a brightness enhancement film, a lower portion of a light collecting film, an upper portion of a reflecting plate, or a reflecting plate.

In an exemplary embodiment of the present specification, the content of dye or pigment included in the light absorption layer may be changed depending on the position of the light absorption layer, and as the light absorption layer is provided at the lower portion, the content of the dye is decreased.

In an exemplary embodiment of the present specification, the display device has a BT2020 coverage of 87% or more when irradiated with light having a maximum light emission wavelength of 440 nm to 460 nm.

In the present specification, the "BT2020" is a standard proposed by the International Telecommunication Union (ITU), and is a word that defines a color region. Further, the BT2020 is the same expression as Rec2020.

In the related art, only a color gamut at levels of sRGB that is a standard for the HD broadcasting and the movie standard (DCI) has been required, but recently, in line with the starting point of the UHD broadcasting, the color gamut of BT2020 that is a UHD TV standard has been required. BT2020 is characterized in that the size of the gamut is large as compared to the existing sRGB and DCI.

When a light absorption layer is applied in the related art, the color gamut increases, but there is a problem in that the brightness decreases. In contrast, by including the above-described color conversion film, the BT2020 can be implemented by 87% or more, more preferably 90% or more without a decrease in brightness. In an exemplary embodiment of the present specification, the upper limit of the BT2020 is not limited, but may be, for example, 100%.

In an exemplary embodiment of the present specification, the display device has an effect in that the brightness is enhanced by applying a light absorption layer and a color conversion film in which a full width at half maximum is narrow and the maximum light emission wavelength range is limited.

That is, an exemplary embodiment of the present specification has an effect in that the color gamut and the brightness are enhanced by including the light absorption layer and the color conversion film as described above.

In an exemplary embodiment of the present specification, the display device may be included in, for example, TV, a monitor of a computer, a notebook computer, a mobile phone, and the like.

MODE FOR INVENTION

Hereinafter, the present specification will be described in detail with reference to Examples for specifically describing the present specification. However, the Examples according to the present specification may be modified in various forms, and it is not interpreted that the scope of the present specification is limited to the Examples described below in detail. The Examples of the present specification are provided to more completely explain the present specification to a person with ordinary skill in the art.

Preparation Example 1

After 0.8 part by weight of a light absorption material (manufactured by Mitsubishi Chemical Corporation, PD319) based on 100 parts by weight of a resin is added to a resin solution (PMMA(BR80):epoxy functional acrylic (GMA acrylic) resin(PD6400)=8:2, Toluene:MEK (5:5)) having a solid content of 30% and the resulting mixture was uniformly mixed, a first light absorption layer having a thickness of 5 um was manufactured on a TAC film by a bar coating. It was confirmed that the first light absorption layer had a transmittance of 11.5% at a maximum absorption wavelength of 593 nm when measured using a UV-visible spectrometer.

Preparation Example 2

A second light absorption layer was manufactured in the same manner as in the first light absorption layer, except that 0.3 part by weight of the light absorption material was added. It was confirmed that the second light absorption layer had a transmittance of 30% at a maximum absorption wavelength of 593 nm measured using a UV-visible spectrometer.

Example 1

A first solution was produced by adding polystyrene (PS), a green fluorescent substance having the following structure, and $TiO_2$ to dimethylformamide (DMF). In this case, 0.35 part by weight of the green fluorescent substance based on 100 parts by weight of PS and 3 parts by weight of $TiO_2$ based on 100 parts by weight of PS were added thereto.

<Green Fluorescent Substance>

After the first solution was applied onto a plastic substrate, a first green film was manufactured by drying the solution.

A second solution was produced by adding PS, a red fluorescent substance having the following structure, and $TiO_2$ to DMF. In this case, 0.07 part by weight of the red fluorescent substance based on 100 parts by weight of PS and 3 parts by weight of $TiO_2$ based on 100 parts by weight of PS were added thereto.

<Red Fluorescent Substance>

After the second solution was applied onto a plastic substrate, a first red film was manufactured by drying the solution.

A first color conversion film was manufactured by laminating the first green film and the first red film.

The brightness and color gamut of the manufactured film was measured by a spectroradiometer (SR series manufactured by Topcon, Inc.). Specifically, a first color conversion film was stacked on one surface of a light guide plate of a backlight unit including the blue LED (450 nm) and the light guide plate, and a prism sheet and a DBEF film, a first light absorption layer, and a liquid crystal panel were sequentially stacked on the first color conversion film, and then a brightness spectrum was measured. In this case, an initial value was set such that the brightness of the blue LED was 80 nit when the color conversion film and the light absorption layer were not present.

Example 2

A third solution was produced by adding polymethylmethacrylate (PMMA), a green fluorescent substance having the following structure, and $TiO_2$ to dimethylformamide (DMF). In this case, 0.25 part by weight of the green fluorescent substance based on 100 parts by weight of PMMA and 3 parts by weight of $TiO_2$ based on 100 parts by weight of PMMA were added thereto.
<Green Fluorescent Substance>

After the third solution was applied onto a plastic substrate, a second green film was manufactured by drying the solution.

A fourth solution was produced by adding PS, a red fluorescent substance having the following structure, and $TiO_2$ to DMF. In this case, 0.07 part by weight of the red fluorescent substance based on 100 parts by weight of PS and 3 parts by weight of $TiO_2$ based on 100 parts by weight of PS were added thereto.
<Red Fluorescent Substance>

After the fourth solution was applied onto a plastic substrate, a second red film was manufactured by drying the solution.

A display device was manufactured in the same manner as in Example 1 and the brightness and the color gamut were measured, except that the second green film and the second red film were stacked and used instead of the first color conversion film.

Example 3

A fifth solution was produced by mixing PS, a green fluorescent substance having the following structure, a red fluorescent substance having the following structure, and $TiO_2$ with DMF. In this case, 0.3 part by weight of the green fluorescent substance based on 100 parts by weight of PS, 0.05 part by weight of the red fluorescent substance based on 100 parts by weight of PS, and 10 parts by weight of $TiO_2$ based on 100 parts by weight of PS were added thereto.

After the fifth solution was applied onto a plastic substrate, a second color conversion film was manufactured by drying the solution.

<Green Fluorescent Substance>

<Red Fluorescent Substance>

A display device was manufactured in the same manner as in Example 1 and the brightness and the color gamut were measured, except that the second color conversion film and the second light absorption layer were applied instead of the first color conversion film and the first light absorption layer, respectively.

Example 4

A sixth solution was produced by adding PMMA, a green fluorescent substance having the following structure, and TiO$_2$ to DMF. In this case, 0.25 part by weight of the green fluorescent substance based on 100 parts by weight of PMMA and 3 parts by weight of TiO$_2$ based on 100 parts by weight of PMMA were added thereto.

<Green Fluorescent Substance>

After the sixth solution was applied onto a plastic substrate, a third green film was manufactured by drying the solution.

A seventh solution was produced by adding PS, a red fluorescent substance having the following structure, and TiO$_2$ to DMF. In this case, 0.1 part by weight of the red fluorescent substance based on 100 parts by weight of PS and 3 parts by weight of TiO$_2$ based on 100 parts by weight of PS were added thereto.

<Red Fluorescent Substance>

After the seventh solution was applied onto a plastic substrate, a third red film was manufactured by drying the solution.

A third color conversion film was manufactured by laminating the third green film and the third red film.

A display device was manufactured in the same manner as in Example 1 and the brightness and the color gamut were measured, except that the third color conversion film was applied instead of the first color conversion film.

Example 5

An eighth solution was produced by adding PS, a green fluorescent substance having the following structure, and TiO₂ to DMF. In this case, 0.3 part by weight of the green fluorescent substance based on 100 parts by weight of PS and 3 parts by weight of TiO₂ based on 100 parts by weight of PS were added thereto.

<Green Fluorescent Substance>

After the eighth solution was applied onto a plastic substrate, a fourth green film was manufactured by drying the solution.

A fourth color conversion film was manufactured by laminating the fourth green film and the second red film. A display device was manufactured in the same manner as in Example 1 and the brightness and the color gamut were measured, except that the fourth color conversion film was applied instead of the first color conversion film.

Comparative Example 1

A display device was manufactured in the same manner as in Example 2 and the brightness and the color gamut were measured, except that the light absorption layer was not applied.

Comparative Example 2

A ninth solution was produced by adding PS, a green fluorescent substance having the following structure, and TiO₂ to DMF. In this case, 0.2 part by weight of the green fluorescent substance based on 100 parts by weight of PS and 3 parts by weight of TiO₂ based on 100 parts by weight of PS were added thereto.

<Green Fluorescent Substance>

After the ninth solution was applied onto a plastic substrate, a fifth green film was manufactured by drying the solution.

A display device was manufactured in the same manner as in Example 2 and the brightness and the color gamut were measured, except that the fifth green film was applied instead of the second green film.

Comparative Example 3

A tenth solution was produced by adding SAN, a green fluorescent substance having the following structure, and TiO₂ to dimethylformamide (DMF). In this case, 0.3 part by weight of the green fluorescent substance based on 100 parts by weight of SAN and 3 parts by weight of TiO₂ based on 100 parts by weight of SAN were added thereto.

<Green Fluorescent Substance>

After the tenth solution was applied onto a plastic substrate, a sixth green film was manufactured by drying the solution.

An eleventh solution was produced by adding PS, a red fluorescent substance having the following structure, and TiO₂ to DMF. In this case, 0.1 part by weight of the red fluorescent substance based on 100 parts by weight of PS and 3 parts by weight of TiO₂ based on 100 parts by weight of PS were added thereto.

<Red Fluorescent Substance>

After the eleventh solution was applied onto a plastic substrate, a fourth red film was manufactured by drying the solution.

A fifth color conversion film was manufactured by laminating the sixth green film and the fourth red film.

A display device was manufactured in the same manner as in Example 1 and the brightness and the color gamut were measured, except that the fifth color conversion film was applied instead of the first color conversion film.

Comparative Example 4

A display device was manufactured in the same manner as in Example 1 and the brightness and the color gamut were measured, except that the fifth green film and the fourth red film were stacked and used instead of the first color conversion film.

Comparative Example 5

A white LED (Blue LED+YAG fluorescent substance) was used instead of the blue LED and the color conversion film, and a display device to which the first light absorption layer was applied was manufactured. Specifically, after a prism sheet and a DBEF film, a first light absorption layer and the liquid crystal panel were sequentially stacked on a light guide plate of a backlight unit including a white LED and the light guide plate, the spectral radiance was measured.

The results of measuring the maximum light emission wavelength and the full width at half maximum of each the green fluorescent substances and the red fluorescent substances used in Examples 1 to 5 and Comparative Examples 1 to 4 and the brightness and the BT2020 of each of the display devices manufactured in Examples 1 to 5 and Comparative Examples 1 to 5 are shown in the following Table 1.

TABLE 1

|  | Green | | Red | | | |
| --- | --- | --- | --- | --- | --- | --- |
|  | Maximum light emission wavelength (nm) | Full width at half maximum (nm) | Maximum light emission wavelength (nm) | Full width at half maximum (nm) | brightness (nit) | BT2020 |
| Example 1 | 526 | 32 | 636 | 46 | 384 | 90% |
| Example 2 | 529 | 32 | 632 | 46 | 408 | 88% |
| Example 3 | 531 | 38 | 635 | 51 | 399 | 87% |
| Example 4 | 529 | 30 | 640 | 49 | 385 | 89% |
| Example 5 | 523 | 28 | 632 | 46 | 390 | 90% |
| Comparative Example 1 | 529 | 32 | 632 | 46 | 507 | 85% |
| Comparative Example 2 | 514 | 35 | 632 | 45 | 355 | 84% |
| Comparative Example 3 | 523 | 28 | 648 | 47 | 316 | 92% |
| Comparative Example 4 | 514 | 35 | 647 | 47 | 294 | 87% |
| Comparative Example 5 | — | — | — | — | 387 | 78% |

From Table 1, it can be confirmed that as compared to Examples 1 to 5, the BT2020 values in Comparative Examples 1 and 2 were less than 87% which is low, the brightness in each of Comparative Examples 3 and 4 was low, and the brightness and the color gamut in Comparative Examples 5 were both low.

Figure 3:
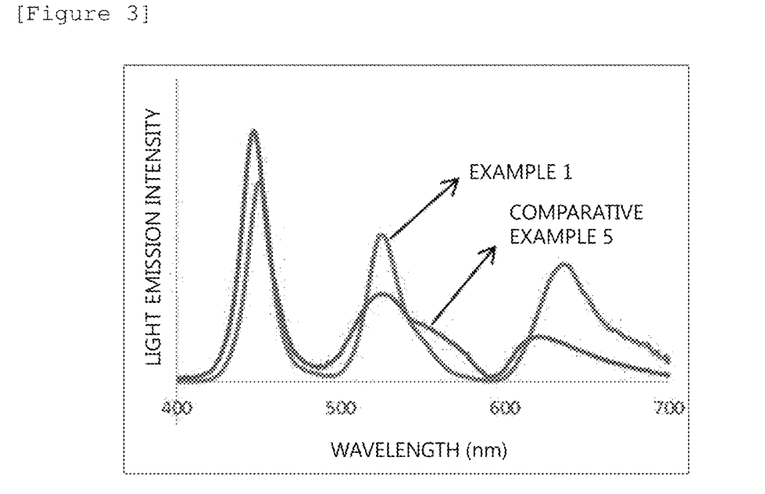
FIG. 3 is a view illustrating the light emission intensity according to the wavelength of the display device according to an exemplary embodiment of the present specification.

FIG. 3 illustrates a light emission intensity according to the wavelength of the display devices manufactured in Example 1 and Comparative Example 5. It can be confirmed that the color purity in Example 1 is improved within a wavelength range of 500 nm to 560 nm and 600 nm to 700 nm as compared to that in Comparative Example 5.

Figure 4:
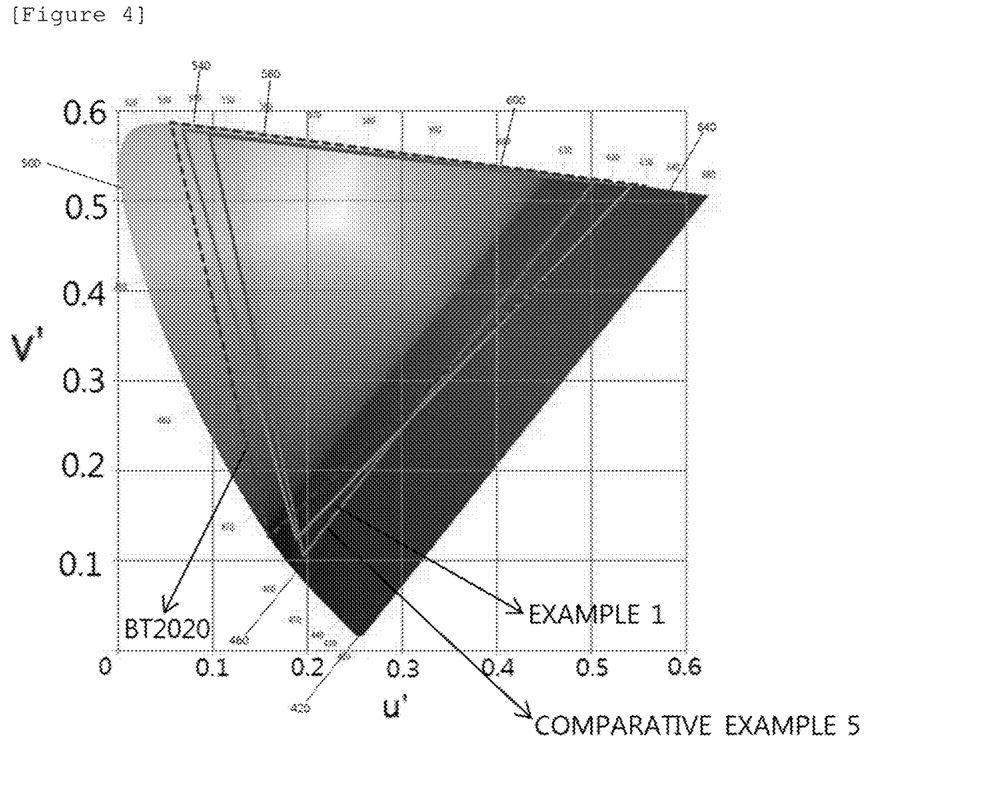
FIG. 4 is a view illustrating a color gamut of the display device according to an exemplary embodiment of the present specification.

FIG. 4 illustrates a color gamut of each of the display devices manufactured in Example 1 and Comparative Example 5. According to FIG. 4, it can be confirmed that the display device manufactured in Example 1 has a wider BT2020 coverage than that of the display device manufactured in Comparative Example 5.

The following Table 2 shows a coordinate value of an apex of a triangle for drawing FIG. 4.

TABLE 2

|  | BT2020 | | Example 1 | | Comparative Example 5 | |
| --- | --- | --- | --- | --- | --- | --- |
|  | u' | y' | u' | y' | u' | y' |
| Blue | 0.159 | 0.126 | 0.188 | 0.124 | 0.196 | 0.106 |
| Green | 0.056 | 0.587 | 0.068 | 0.579 | 0.097 | 0.573 |
| Red | 0.557 | 0.517 | 0.543 | 0.517 | 0.502 | 0.521 |

The invention claimed is:

1. A display device comprising:
a liquid crystal panel; and
a backlight unit,
wherein the backlight unit comprises one or more color conversion films,
wherein a light absorption layer is included in the liquid crystal panel or backlight unit,
wherein the color conversion film shows, during light irradiation, (1) a first light emission peak in which a light emission peak having the maximum height in a wavelength range of 500 nm to 560 nm is present from 520 nm to 535 nm and a full width at half maximum of the light emission peak is 50 nm or less and (2) a second light emission peak in which a light emission peak having the maximum height in a wavelength range of 600 nm to 780 nm is present from 625 nm to 640 nm and a full width at half maximum of the light emission peak is 60 nm or less,
wherein the light absorption layer has a light transmittance of 5% to 40% at a maximum absorption wavelength of 560 nm to 610 nm,
wherein the display device has a BT2020 coverage of 87% or more when irradiated with light having a maximum light emission wavelength of 440 nm to 460 nm,
wherein the color conversion film has a thickness of 2 μm to 20 μm, wherein the light absorption layer comprising a resin matrix; and a dye or pigment dispersed in the resin matrix, wherein the dye or pigment is included in an amount of 0.1 part by weight to 3 parts by weight based on 100 parts by weight of a solid content of the resin matrix, wherein the light absorption layer has a thickness of 3 μm to 25 μm, wherein the color conversion film comprises at least one green BODIPY-based organic fluorescent substance and at least one red BODIPY-based organic fluorescent substance, wherein the at least one green BODIPY-based organic fluorescent substance is represented by Formula 1:

[Formula 1]

wherein X1 and X2 are the same as or different from each other, and are each independently a halogen group; a cyano group; a nitro group; an imide group; an amide group; a carbonyl group; an ester group; a substituted or unsubstituted fluoroalkyl group; a substituted or unsubstituted sulfonyl group; a substituted or unsubstituted sulfonamide group; a substituted or unsubstituted alkoxy group; a substituted or unsubstituted aryloxy group; or a substituted or unsubstituted aryl group, R1 to R4 are the same as or different from each other, and are each independently hydrogen; deuterium; a nitro group; a substituted or unsubstituted ester group; a substituted or unsubstituted alkyl group; a substituted or unsubstituted fluoroalkyl group; a substituted or unsubstituted cycloalkyl group; a substituted or unsubstituted alkoxy group; a substituted or unsubstituted aryloxy group; or a substituted or unsubstituted aliphatic heterocyclic group, R5 and R6 are the same as or different from each other, and are each independently hydrogen; a cyano group; a nitro group; a carboxyl group; a substituted or unsubstituted alkyl group; a substituted or unsubstituted sulfonyl group; or an aryl group unsubstituted or substituted with an arylalkynyl group, wherein optionally R1 and R5 are linked to each other to form a substituted or unsubstituted hydrocarbon ring or a substituted or unsubstituted hetero ring, and wherein optionally R4 and R6 are linked to each other to form a substituted or unsubstituted hydrocarbon ring or a substituted or unsubstituted hetero ring, and R7 is hydrogen; an alkoxy group; a substituted or unsubstituted alkyl group; a substituted or unsubstituted aryloxy group; a haloalkyl group; or a substituted or unsubstituted aryl group; and wherein the at least one red BODIPY-based organic fluorescent substance is represented by Formula 2

[Formula 2]

wherein R11, R13, R14, and R16 are the same as or different from each other, and are each independently a substituted or unsubstituted aryl group; or a substituted or unsubstituted heterocyclic group, R12 and R15 are the same as or different from each other, and are each independently hydrogen; deuterium; a halogen group; a nitrile group; a nitro group; a hydroxyl group; a carboxyl group (—COOH); an ether group; an ester group; an imide group; an amide group; a substituted or unsubstituted alkyl group; a substituted or unsubstituted cycloalkyl group; a substituted or unsubstituted alkoxy group; a substituted or unsubstituted aryloxy group; a substituted or unsubstituted alkylthioxy group; a substituted or unsubstituted arylthioxy group; a substituted or unsubstituted alkylsulfoxy group; a substituted or unsubstituted arylsulfoxy group; a substituted or unsubstituted alkenyl group; a substituted or unsubstituted silyl group; a substituted or unsubstituted boron group; a substituted or unsubstituted amine group; a substituted or unsubstituted arylphosphine group; a substituted or unsubstituted phosphine oxide group; a substituted or unsubstituted coumarin group; a substituted or unsubstituted aryl group; a substituted or unsubstituted anthracenyl group; a substituted or unsubstituted phenanthrenyl group; a substituted or unsubstituted phenalenyl group; or a substituted or unsubstituted heterocyclic group, X3 and X4 are the same as or different from each other, and are each independently a halogen group; a nitrile group; a substituted or unsubstituted ester group; a substituted or unsubstituted alkyl group; a substituted or unsubstituted alkoxy group; a substituted or unsubstituted alkenyl group; a substituted or unsubstituted alkynyl group; a substituted or unsubstituted aryl group; a substituted or unsubstituted aryloxy group; or a substituted or unsubstituted heterocyclic group, and R17 is a coumarin moiety unsubstituted or substituted with an alkoxy group.

2. The display device of claim 1, wherein the color conversion film having the first light emission peak and the second light emission peak is a single film.

3. The display device of claim 1, wherein the color conversion film comprises a first color conversion film having the first light emission peak and a second color conversion film having the second light emission peak.

4. The display device of claim 1, wherein in the second light emission peak the light emission peak having the maximum height in a wavelength range of 600 nm to 780 nm is present from 630 nm to 640 nm.

5. The display device of claim 1, wherein the backlight unit further comprises at least one of a light guide plate; a reflecting plate; a light collecting film; and a brightness enhancement film.

6. The display device of claim 1, wherein the backlight unit comprises a light source comprising a light emission lamp that emits light having a maximum light emission wavelength of 440 nm to 460 nm.

* * * * *